United States Patent [19]
Morita

[11] 3,816,361
[45]* June 11, 1974

[54] TREATING RUBBER TO ENHANCE FIBER BONDING

[75] Inventor: Eiichi Morita, Copley, Ohio

[73] Assignee: Monsanto Company, St. Louis, Mo.

[*] Notice: The portion of the term of this patent subsequent to Feb. 22, 1989, has been disclaimed.

[22] Filed: Jan. 26, 1972

[21] Appl. No.: 221,105

Related U.S. Application Data

[63] Continuation-in-part of Ser. No. 60,161, July 31, 1970, Pat. No. 3,644,268.

[52] U.S. Cl. ................... 260/3, 156/334, 156/335, 161/231, 260/4 R, 260/4 AR, 260/5, 260/38, 260/41.5 A, 260/845, 260/846, 260/873

[51] Int. Cl. ...... C08g 37/16, C08d 9/02, C08d 9/04

[58] Field of Search .............. 260/3, 845, 846, 38, 4

[56] References Cited
UNITED STATES PATENTS

| | | | |
|---|---|---|---|
| 2,801,980 | 8/1957 | Spacht | 260/4 |
| 3,507,689 | 4/1970 | Freytag | 260/845 |
| 3,598,690 | 8/1971 | Danielson | 260/3 |
| 3,638,702 | 2/1972 | Endter | 260/3 |
| 3,644,268 | 2/1972 | Morita | 260/845 |

*Primary Examiner*—John C. Bleutge

[57] ABSTRACT

Fiber to rubber adhesion is enhanced by incorporating into the rubber a formaldehyde donor and a saturated polymer comprising alkylene bridged resorcinol. The saturated polymer results from introducing unsaturated radicals in the resorcinol nucleus.

7 Claims, No Drawings

TREATING RUBBER TO ENHANCE FIBER BONDING

This application is a continuation-in-part of application Ser. No. 60,161 filed July 31, 1970 now U.S. Pat. No. 3,644,268 issued Feb. 22, 1972. This invention relates to methods of treating rubber to enhance the bonding to fiber reinforcing elements and to the rubber products so obtained.

BACKGROUND OF THE INVENTION

The addition to rubber of silica, resorcinol and hexamethylenetetramine or other formaldehyde donor yields rubber compositions having increased affinity for fiber reinforcing elements. The treatment of rubber instead of the fiber for preparing fiber to rubber bonded composites has a number of advantages and this invention is concerned with improvements in treating the rubber component although it may be practiced in conjunction with treated fiber if desired and further improvements may sometimes be obtained thereby.

SUMMARY OF THE INVENTION

Adhesion of fiber to rubber is promoted by incorporating into the rubber a formaldehyde donor and an essentially saturated polymer of resorcinol and an unsaturate. The presence of the said polymer in the rubber also promotes building tack. The polymers contain alkylene diresorcinol units comprising alkylene bridged resorcinol of two or more resorcinol units.

The unsaturate-resorcinol polymers characterized by resorcinol units may be produced by the acidic condensation of resorcinol with an unsaturate. The alkylene bridge may be derived from an unsaturate selected from the group consisting of (1) a halo-olefin of three to 10 carbon atoms, (2) a dihalo-olefin of three to 10 carbon atoms, (3) an acyclic or cyclic diolefin of three to 10 carbon atoms or (4) an alkine of two to 10 carbon atoms. Acidic conditions favor introduction of an unsaturated group into the resorcinol nucleus and further condensation occurs until essentially no unsaturation remains.

Generally, the reaction may be effected between 50° and 150°C. preferably by adding the unsaturate under acidic conditions to resorcinol. Higher temperatures are preferred because the reaction is completed in a shorter time. The reaction may be carried out by adding the unsaturate to molten resorcinol, but it is generally more convenient to conduct the reaction with the resorcinol in an inert solvent. The use of a solvent aids in mixing the reactants, provides a uniform reaction temperature and permits easy removal of by-products. A number of solvents are suitable reaction media; the only requisites are that the solvent does not react with any of the starting materials or products of the reaction and is easily removed from the final product. Xylene is an excellent solvent for this purpose.

The mole ratio of unsaturate to resorcinol is 0.5 to 2.0 moles per mole of resorcinol. The unsaturate is either an alkine or olefin having two or more reactive sites, one of which is an ethylenically unsaturated bond. More specifically, a straight, branched chain, or cyclic diolefin may be used, or a mono- or dihalo-olefin.

When using an unsaturate having no halogen present such as an alkine or diolefin hydrocarbon, it is necessary to add a sufficient quantity of an acid, such as hydrogen chloride, to assure that the reaction is conducted under acidic conditions. When using the halo-olefins, no additional acid is required since hydrogen halide is a by-product which maintains acidic conditions in the reaction mixture. An olefin of three to 10 carbon atoms is preferred. The addition of other catalysts is not necessary but may be used if desired. Examples of other catalysts are sulfuric acid, acid clay, zinc chloride and cuprous chloride. In the presence of cuprous chloride alkenyl resorcinols form under mild reaction conditions and heating in the presence of resorcinol easily effects an exothermic reaction resulting in formation of the adhesive.

Halo-olefins suitable for the practice of this invention are illustrated by 3-chloropropene, 3-chloro-1-butene, 4-chloro-1-butene, 1-chloro-2-butene, 3-chloro-2-methylpropene, 3-chloro-1-pentene, 5-chloro-2-pentene, 4-chloro-2-methyl-2-butene, 4-chloro-1-hexene, 6-chloro-1-hexene, 2-chloro-3-hexene, 1-chloro-3-hexene and their halo counterparts in place of chlorine.

Examples of suitable dihalo-olefins are 1,3-dichloropropene, 2,3-dichloropropene, 1,3-dichloro-2-butene, 1,4-dichloro-2-butene, 1,3-dichloro-1-butene, 1,4-dichloro-1-butene, 3,4-dichloro-1-butene, 1,5-dichloro-1-pentene, 1,3-dichloro-1-pentene, 1,3-dichloro-2-pentene, 1,4-dichloro-2-pentene, 1,5-dichloro-2-pentene, 1,3-dichloro-2-methyl-2-butene, 1,6-dichloro-1-hexene, 1,3-dichloro-3-hexene, 1,4-dichloro-2,3-dimethyl-2-butene and their halo counterparts other than chlorine.

It is understood that the halo-olefin reactant must have at least one reactive halogen, preferably an allylic halogen.

Examples of suitable diolefins are propadiene, 1,3-butadiene, 1,3-pentadiene, 2-methyl-1,3-butadiene, 1,5-hexadiene, 2-methyl-1,3-pentadiene, 4-methyl-1,3-pentadiene, 1,7-octadiene, 5,7-dimethyl-1,6-octadiene, 1,5-cyclooctadiene and 1,4-cyclooctadiene.

Examples of suitable alkines are acetylene, propyne (allylene), 1-butyne and 2-butyne.

DESCRIPTION OF PREFERRED EMBODIMENTS

A solution of 220 grams (two moles) of resorcinol in 400 ml. of xylene is prepared and heated to 100°–120°C. Allyl chloride is then added and after the reaction is complete the upper solvent layer is decanted and the residual solvent is removed by heating the remaining reaction mixture in vacuo. A summary of three preparations in which the allyl chloride varied is as follows:

| Allyl Chloride | Feed Time | Total Heating Time | Wt. of Reaction Product, Grams |
|---|---|---|---|
| 1 mole | 85 min. | 4 hrs. | 200 |
| 2 moles | 3 hrs. | 5.5 hrs. | 256 |
| 3 moles | 5 hrs. | 8.5 hrs. | 299 |

The apparent molecular weight distribution analyzed by gel permeation chromatography is summarized below:

| Allyl Chloride | % Apparent MW<180 | % Apparent MW 232 | % Apparent MW 456 | % Apparent MW 675 | % Apparent Avg. MW |
|---|---|---|---|---|---|
| 1 mole | 2 | 40 | 26 | 17 | 15 (1000) |
| 2 moles | 3 | 28 | 19 | 16 | 34 (1200) |
| 3 moles | 4 | 15 | 13 | 13 | 55 (1500) |

A rubber stock is compounded comprising:

|  | Base Stock Parts by Weight |
|---|---|
| Smoked Sheet Rubber | 50 |
| Styrene Butadiene Copolymer Rubber | 68.8 |
| Furnace Carbon Black (FEF) | 35 |
| Silica (Hi Sil 233) | 15 |
| Zinc Oxide | 3 |
| Stearic Acid | 2 |
| N-Cyclohexyl-2-benzothiazolesulfenamide | 1 |
| Hexamethylenetetramine | 1.6 |
| Sulfur | 2.0 |

The relative adhesion characteristics between fiber and vulcanized rubber product are determined by measuring the force required to pull a treated cord embedded in a strip of vulcanized rubber prepared from the foregoing base stock. The test is called an H-test and derives its name from the shape of the rubber cord article formed in the vulcanization mold. To the base stock is added 2.5 parts of resorcinol or 2.5 parts of the saturated alkylene di-resorcinol polymer prepared from allyl chloride and resorcinol in the ratio indicated in the table below. The base stock alone serves as control. Polyester cord is embedded in the rubber and is cured in the conventional H-test sample mold having rubber strip channels three-eighths-inch wide by 0.1 inch deep and separated from one another by one-fourth-inch. In one series of tests the cord embedded in the rubber is untreated. In the second series of tests the cord is coated or dipped in a solution of the same material as added to the base stock. Thus, the cord is treated with allyl chloride/resorcinol (1.0 to 1.0 mole ratio) reaction product and embedded in a base stock to which has been added an allyl chloride-resorcinol reaction product. The results are recorded below.

| Polyester (lbs.) Addition to Base Stock | H-Test Adhesion to ||
|---|---|---|
|  | Untreated | Treated |
| None | 3.1 | — |
| Resorcinol | 2.9 | 12.1 |
| Allyl chloride 0.65/resorcinol 1.0 | 9.7 | 14.5 |
| Allyl chloride 1.0/resorcinol 1.0 | 12.3 | 12.8 |
| Allyl chloride 2.0/resorcinol 1.0 | 3.6 | 8.6 |

Cords treated with other treating agents, for example RFL, give improved adhesion values when the polymers of this invention are added to the rubber stock.

The adhesion of rayon and nylon to the stocks containing the allyl chloride resorcinol reaction product as compared to the base stock alone is shown by the following.

| Untreated Cord (lbs) Addition to Base Stock | H-Test Adhesion of ||
|---|---|---|
|  | Rayon | Nylon |
| None | 6.7 | 3.3 |
| Allyl chloride 0.65/resorcinol 1.0 | 24.0 | 22.3 |
| Allyl chloride 1.0/resorcinol 1.0 | 25.1 | 22.1 |
| Allyl chloride 2.0/resorcinol 1.0 | 7.8 | 4.2 |

Although it is preferable for obtaining maximum adhesion for the stocks to contain silica, the invention is not limited thereto since cord to rubber adhesion is improved in the absence of silica. A rubber stock is prepared similar to the previously described recipe except 15 additional parts carbon black are used in place of the silica. The other ingredients are the same except for hexamethylenetetramine, which is added in the indicated amounts as shown below.

| Test | 1 | 2 | 3 | 4 |
|---|---|---|---|---|
| Masterbatch | 173.8 | 173.8 | 173.8 | 173.8 |
| Allyl chloride 1.0/resorcinol 1.0 reaction product | — | 2.5 | — | 2.5 |
| Hexamethylenetetramine | — | — | 1.6 | 1.6 |
| Cord | H-Test Adhesion to Polyester (lbs.) ||||
| Untreated 1000/2 polyester | 3.0 | 3.0 | 3.3 | 6.2 |
| Treated 1000/2 polyester | 4.6 | 4.7 | 8.2 | 11.4 |

The unsaturate-resorcinol polymers are good tackifiers for synthetic elastomers. Natural rubber has sufficient tack to enable fabrication of products without layer separation before vulcanization. However, many synthetic elastomers are so deficient in tack that products cannot be fabricated without using tackifiers to enhance the adhesion of the components.

The tackifying property of the instant polymers is illustrated by comparing the tack of a styrene-butadiene copolymer stock with the tack of the same stock containing the unsaturate-resorcinol polymer. The tack properties are determined by means of a Skewis tackmeter by the method described by J. D. Skewis, Rubber Chem. Technol. 38, 689 (1965). The values obtained are the time in seconds which is required to separate two specimens of the test material. Longer times are indicative of improved cohesion. The values shown below are the average of five determinations. Sample A comprises 100 parts (all parts by weight) styrene-butadiene copolymer, 52 parts HAF carbon black and 10 parts high aromatic processing oil. Sample B comprises, in addition to the same ingredients as in Sample A, 5 parts of allyl chloride 1.0/resorcinol 1.0 reaction product.

| Sample | Tack (sec.) |
|---|---|
| A | 44 |
| B | 112 |

The adhesive of this invention maybe used with natural rubber, synthetic rubber having sufficient unsaturation to enable sulfur vulcanization, or mixtures thereof. Examples of suitable synthetic rubbers are styrene-butadiene copolymer, isobutylene-isoprene copolymer, ethylene-propylene-diene terpolymers, butadiene-acrylonitrile copolymer, polymers of chloroprene and synthetic polyisoprene. The polymers of this invention may be advantageously used in rubber stocks containing the commonly used accelerators, antidegradants, fillers and reinforcement agents. The amount of polymer required depends upon a number of factors but generally falls within the range of 0.5–10.0 parts per 100 parts elastomer.

Any formaldehyde donor which upon heating releases formaldehyde or furnishes radicals capable of forming methylene bridges is suitable for the practice of this invention. Examples of such materials are hexamethylenetetramine, hexamethoxymethylmelamine, cyclotrimethyltriamines and [(hydroxymethyl)ethylidene] alkylamines.

Other fibers than those particularly mentioned may be incorporated into rubber stocks prepared according to this invention. Examples are fibers of cotton, wool, wood cellulose, glass, aluminum, copper, tin, steel, brass plated steel and aluminum-steel alloys. The preparation of aluminum-steel alloy fibers and stainless steel fibers useful for making reinforced rubber articles is described in British Pat. No. 1,153,577, May 29, 1969.

EXTENDED DISCLOSURE

For the practice of this invention, any olefinic reactant which introduces an unsaturated radical of three to 10 carbon atoms into the nucleus of the resorcinol which unsaturated radical further condenses producing saturated resorcinol polymer having alkylene bridges of at least two carbon atoms is suitable. In addition to unsaturates previously disclosed, suitable unsaturate-resorcinol polymers characterized by resorcinol units connected by alkylene bridges may also be prepared by the acidic condensation of resorcinol and olefinic alcohols or olefinic alcohol precursors. Branched or unbranched olefinic alcohols of three to 10 carbon atoms having at least two reactive sites are satisfactory. A difunctional alcohol is an alcohol having one hydroxy radical as one reactive site and one olefinic bond as the other. A trifunctional alcohol may have either two hydroxy radicals and one olefinic bond or one hydroxyl radical and two olefinic bonds. It is believed that the unsaturate-resorcinol polymers are the same regardless of whether the alkylene bridge is derived from a haloolefin, diolefin or an olefinic alcohol. Representative examples of unsaturated alcohols which are satisfactory unsaturate reactants are allyl alcohol, methallyl alcohol, crotyl alcohol (2-buten-1-ol), cinnamyl alcohol, 1,5-dimethyl-4-hexen-1-ol, 1-methyl-2-buten-1-ol, 3-hexen-1-ol, 4,6-dimethyl-1-hepten-4-ol, 3-octen-1-ol, 2,2-dimethyl-3-hexen-1-ol, 3,7-dimethyl-6-octen-1-ol, 3,7-dimethyl-2,6-octadiene-1-ol, 3,7-dimethyl-1,6-octadiene-3-ol and 3(4-hydroxy-3-methoxy-phenyl)-2-propen-1-ol(coniferyl alcohol).

The term olefinic alcohol precursor means unsaturated esters or unsaturated ethers which upon acid hydrolysis yield olefinic alcohols. Formate, acetate, propionate and butyrate esters of any of the above illustrated unsaturated alcohols are satisfactory, for example, allyl formate, allyl acetate, allyl propionate, methallyl acetate, crotyl acetate and the like. Symmetrical and unsymmetrical ethers are satisfactory provided that the ether gives two moles of unsaturated radical when introduced into the resorcinol nucleus wherein each mole may be the same or different. Illustrative examples of satisfactory ethers are allyl ether, bis(2-methylallyl)ether, allyl-3-methyl-3-butenyl ether and 2-butenyl-1-methylallyl ether. It is understood that the invention is not limited to the unsaturate reactants disclosed for illustrative purposes but that the invention is applicable to any olefinic alcohol of three to 10 carbon atoms or olefinic alcohol precursor which yields said alcohols of three to 10 carbon atoms. Further examples would only unduly extend the disclosure without contributing to a better understanding of the invention. Many olefinic alcohols and alcohol precursors are known and may be readily found in the literature.

The mole ratio of unsaturate-to-resorcinol is the same for olefinic alcohols and alcohol precursors as other unsaturate reactants previously discussed. Typical preparations using alkyl alcohol as unsaturate are illustrated below.

Resins are prepared by adding dropwise over a period of 50–90 minutes 43.5 g of allyl alcohol to a mixture comprising 110 g of resorcinol and 1–8 g of acid catalyst (conc. HCl or $H_2SO_4$). The mixture is heated at 100°–120°C for 2–4 hours. When HCl is used as catalyst, the reaction mass is vacuum stripped at about 150°C and 30 mm Hg. When $H_2SO_4$ is used, the reaction mass is neutralized by caustic addition before stripping. Brittle resins are obtained (yield 125–145 g) having an average number molecular weight between 700–850 with the higher molecular weight products obtained when larger quantities of catalyst are used. The resins contain about 17–24 percent free resorcinol.

A rubber stock is prepared similar to the previously described recipe except the N-cyclohexyl-2-benzothiazolesulfenamide is replaced with 0.5 parts of N-tert-butyl-2-benzothiazolesulfenamide. The adhesion of nylon 840/2 tire cord and rayon 2200/3 tire cord to stocks containing 2 parts of the unsaturated resorcinol polymer is compared to the adhesion of the same tire cords in the base stock alone.

| Untreated Cords (lbs) Addition to Base Stock | H-Test Adhesion of | |
| --- | --- | --- |
| | Rayon | Nylon |
| None | 5.0 | 3.6 |
| Allyl Chloride 1.0/resorcinal 1.0 | 22.2 | 19.3 |
| Allyl alcohol 0.75/resorcinal 1.0 | 22.9* | 17.8* |

*The average of the values obtained for four separate preparations of the polymers.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. The method of making fiber reinforced rubber having the fiber bonded to the rubber which comprises incorporating fiber and an adhesion-enhancing amount of a combination comprising a formaldehyde donor and an essentially saturated polymer of resorcinol resulting from introducing olefinic unsaturated radical of three to 10 carbon atoms into the nucleus of resorcinol under conditions of further condensation said polymer comprising resorcinol units connected by alkylene bridges of at least two carbon atoms, into a vulcanizable rubber stock, said polymer being present in the amount of 0.5–10.0 parts per 100 parts rubber and heating to form a vulcanized fiber bonded rubber product.

2. The method of claim 1 in which the polymer is prepared by reaction of 0.5 to 2 moles of unsaturate per mole of resorcinol.

3. The method of claim 2 in which the unsaturate is selected from the group consisting of (1) halo-olefin, (2) dihalo-olefin, (3) acyclic or cyclic diolefin and (4) olefinic alcohol or olefinic alcohol precursor.

4. The method of claim 3 in which the fiber is selected from the group consisting of polyester, rayon and nylon.

5. The method of claim 3 in which the polymer is the reaction product of about 0.5 to about 1 mole of allyl chloride per mole of resorcinol.

6. The method of claim 3 in which the polymer is the reaction product of about 0.5 to about 1 mole of allyl alcohol per mole of resorcinol.

7. The method of claim 3 in which the rubber stock contains silica.

* * * * *